United States Patent [19]

Kakuse et al.

[11] Patent Number: 4,663,752
[45] Date of Patent: May 5, 1987

[54] SECTOR MARK SIGNAL CONTROL CIRCUIT FOR DISC APPARATUS

[75] Inventors: Katsuharu Kakuse, Hadano; Tokuhiro Tsukiyama, Kanagawa, both of Japan

[73] Assignee: Hitachi, Ltd., Tokyo, Japan

[21] Appl. No.: 714,917

[22] Filed: Mar. 22, 1985

[30] Foreign Application Priority Data

Mar. 26, 1984 [JP] Japan .................................. 59-56177

[51] Int. Cl.$^4$ ........................ G11B 7/013; G11B 20/18
[52] U.S. Cl. ........................................ 369/48; 369/54; 369/124; 358/336; 360/38.1
[58] Field of Search ...................... 360/38, 1; 358/336, 358/314; 369/32, 59, 54, 58, 47, 48, 124

[56] References Cited

U.S. PATENT DOCUMENTS

| | | | |
|---|---|---|---|
| 4,363,116 | 12/1982 | Kleuters | 369/47 |
| 4,409,627 | 10/1983 | Eto | 360/38.1 |
| 4,523,304 | 6/1985 | Satoh | 358/342 |
| 4,535,439 | 8/1985 | Satoh | 369/32 |

OTHER PUBLICATIONS

Nikker Electronics, 11/21/83, pp. 189-213.

*Primary Examiner*—Alan Faber
*Attorney, Agent, or Firm*—Antonelli, Terry & Wands

[57] ABSTRACT

In an optical disc apparatus using an optical disc which has a number of sectors for recording coded information therein, a sector mark formed of a special pattern is previously recorded in each sector at the starting position thereof, to correctly read-out information recorded in each sector. In the case where the optical disc is normally operated, a normal sector mark signal corresponding to each sector mark is detected at a fixed time interval. However, the normal sector mark signal may not be detected for some reasons. A circuit is herein disclosed which generates a pseudo sector mark signal synchronized with the normal sector mark signal. When the normal sector mark signal is not detected, the psuedo sector mark signal is generated, and information recorded in a sector is appropriately processed on the basis of the pseudo sector mark signal. Further, this circuit is provided with circuit means for inhibiting the normal sector mark signal and psuedo sector mark signal from being delivered when the pseudo sector mark signal has been generated a predetermined number of times continuously. However, such inhibition is released when the repetition period of the normal sector mark signal is judged to lie within a predetermined range.

7 Claims, 3 Drawing Figures

SECTOR MARK SIGNAL CONTROL CIRCUIT FOR DISC APPARATUS

BACKGROUND OF THE INVENTION

The present invention relates to a sector mark signal control circuit for a disc apparatus, and more particularly to the generation of a sector mark signal in an optical disc apparatus where coded information is recorded on an optical disc in such a manner that each of sectors formed on the optical disc is used as a recording unit.

Unlike the case where analog information (such as image data and video information) is recorded in an optical disc, it is desirable to record coded information (that is, digital information) on an optical disc so that data having a predetermined length can be used as an access unit. Accordingly, each track on the optical disc is divided into a number of equal sectors, and each of the sectors is assigned an address, to be used as an access unit in both a recording operation and a reproducing operation. The technique of this kind is disclosed, for example, in U.S. Pat. No. 4,363,116, and in the Nov. 21, 1983 issue of the "NIKKEI ELECTRONICS" on page 195 (pp. 189-213).

In the above-mentioned recording/reproducing method, however, in order to surely perform a recording/reproducing operation for an addressed or selected sector, it is required to correctly detect the starting position of the addressed sector. Accordingly, a mark formed of a special pattern (namely, a sector mark) is previously recorded on the optical disc at the starting position of each sector, and a sector mark signal (hereinafter referred to as "SM signal") is generated each time the sector mark is detected, to control a data recording operation or data read-out operation.

In some cases, however, owing to a strain on the optical disc, an erroneous tracking operation, the deterioration of a recorded pattern, and others, the sector mark cannot be detected though the sector mark is scanned by read means such as an optical head.

SUMMARY OF THE INVENTION

It is an object of the present invention to provide a sector mark signal control circuit which can appropriately process information recorded in a sector even when the sector mark of the sector is not detected.

On the basis of the fact that the sector mark is detected at a fixed time interval, according to the present invention, there is provided a circuit which generates a predetermined signal at a time interval, at which the sector mark should be detected. The above signal will be hereinafter referred to as a "pseudo SM signal". When a normal SM signal is not detected or is detected at a time far from a predetermined time, information recorded in a sector corresponding to the normal SM signal is processed on the basis of the pseudo SM signal. The use of the pseudo SM signal is very effective for the case where a failure to detect the sector mark takes place intermittently.

On the other hand, in the case where a series of sector marks is not detected, the pseudo SM signal is continuously generated. In such a case, there arises the following problem. The pseudo SM signal is generated when the normal SM signal has not been detected in a predetermined period. That is, the pseudo SM signal is generated after a time the normal SM signal should be generated. Accordingly, in the case where the pseudo SM signal is continuously generated in a period when a time required for scanning the distance between adjacent sector marks by an optical head is made shorter for reasons such as variations in the rotating speed of the optical disc, an interval between a time a sector mark reaches actually a position of a light beam from the optical head according to the rotation of the optical disk and a time the pseudo SM signal is generated, may exceed a maximum permissible limit. Thus, a recording or reproducing operation fails to catch a synchronization mark, and therefore there is the fear that data is erroneously read out from the optical disc. Further, owing to the deterioration of recorded pattern, a pattern in a field of a sector other than a sector mark field thereof may be mistaken for a sector mark. In the case where such a pattern is detected at a time interval similar to a time interval at which the normal sector mark should be detected, the pseudo SM signal is generated at a time which has no connection with a time the normal sector mark should be detected.

It is accordingly another object of the present invention to provide a sector mark signal control circuit which can prevent information in a sector corresponding to the pseudo SM signal from being erroneously processed in the case where the pseudo SM signal is continuously generated and therefore delivered at a time different from an expected time.

According to the present invention, when the pseudo SM signal is continuously generated a predetermined number of times, the generation thereof is stopped and thus information in sectors scanned after this time is not processed. Further, according to the present invention, there is provided a repetition period check circuit for checking the repetition period of the SM signal read-out from an optical disc. When it is judged by the repetition period check circuit that the repetition period of the normal SM signal is outside a predetermined range, the generation of the pseudo SM signal is still prevented. While, in the case where the repetition period of the normal SM signal is discriminated to be in the predetermined range, that is, a normal state is restored, the generation of SM signal is allowed, and thus the normal SM signal (namely, a first SM signal) or pseudo SM signal (namely, a second SM signal) is generated on the basis of a timing signal having the same repetition period as that of the normal SM signal. Thereafter, information in sectors is processed on the basis of the normal or pseudo SM signal.

DESCRIPTION OF THE PREFERRED EMBODIMENT

An embodiment of a sector mark signal control circuit according to the present invention will be explained below, with reference to the drawings.

Figure 1:
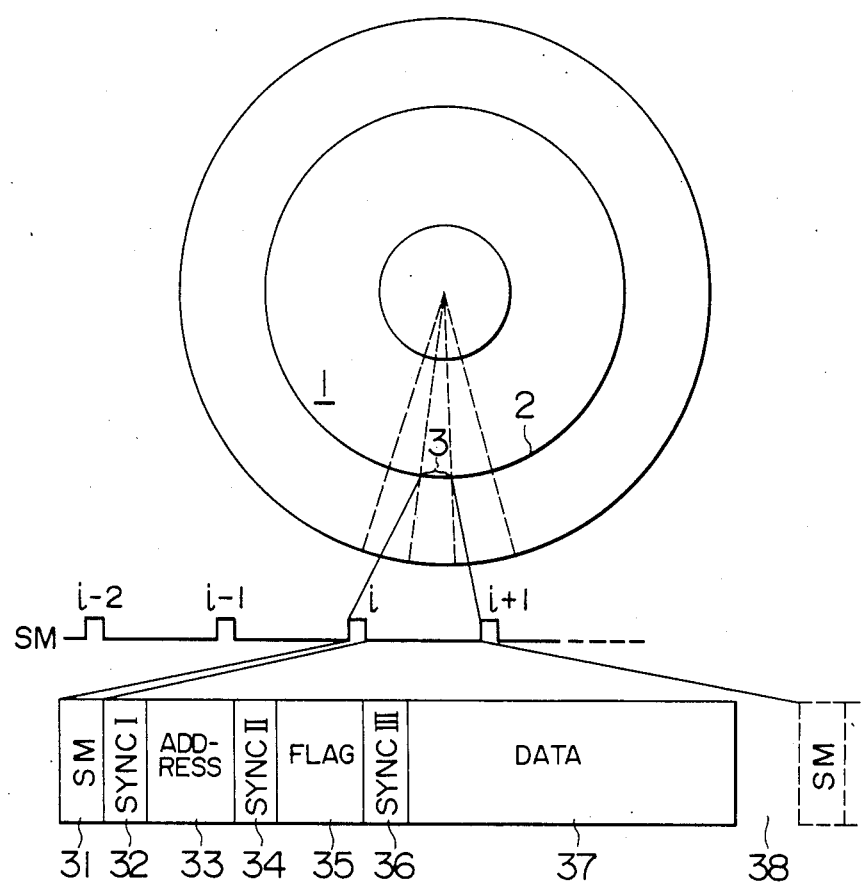
FIG. 1 is a schematic diagram showing an optical disc and the construction of a sector formed on the optical disc.

FIG. 1 is a schematic diagram for explaining sectors formed on an optical disc, and for explaining a sector mark provided in each sector.

Referring to FIG. 1, a large number of tracks 2 are provided on an optical disc 1 so that a spiral is formed of the tracks 2. In the case where coded information is recorded in and reproduced from the optical disc 1 through the random access method, it is desirable to divide each track 2 into a number of blocks, each of which is used as a recording/reproducing unit. Such a block is called a sector. The optical disc 1 used in the present embodiment, for example, includes 41,300 tracks, and each track is divided into 64 sectors.

Next, the construction of a sector 3 will be explained. As shown in FIG. 1, a sector mark SM designated by reference numeral 31 is recorded in the sector 3 at the starting position thereof. The sector mark 31 has a predetermined, special pattern. The sector 3 includes an address field 33, a flag field 35, and a data field 37. The address of the sector 3 is recorded in the address field 33. Further, information on the status (e.g. usable or not, usage, etc.) of the present sector 3 is recorded in the flag field 35, and data used by a user is recorded in the data field 37. Synchronization marks SYNC I, II and III designated by reference numerals 32, 34 and 36 are provided in front of the fields 33, 35 and 37, respectively, to control the timing of at least read-out for these following fields. Although the marks SYNC I and SYNC II are previously recorded in the sector 3, the mark SYNC III is recorded in the sector 3 when data is recorded in the data field 37. Incidentally, a gap 38 is provided between adjacent sectors.

Figure 2:
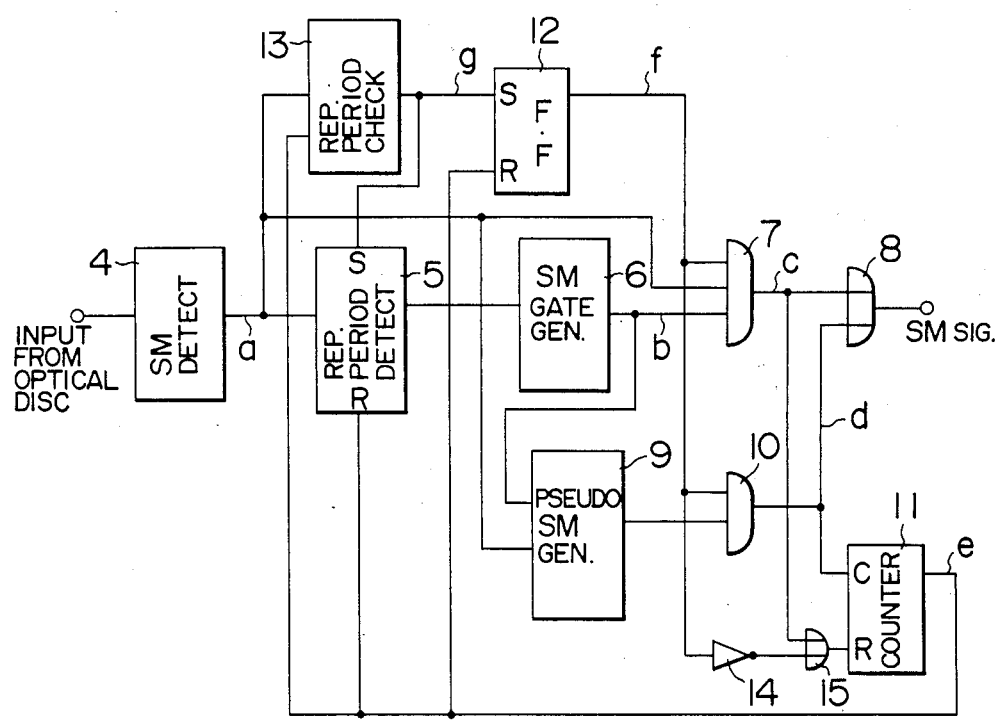
FIG. 2 is a circuit diagram showing an embodiment of a sector mark signal control circuit according to the present invention.
Figure 3:
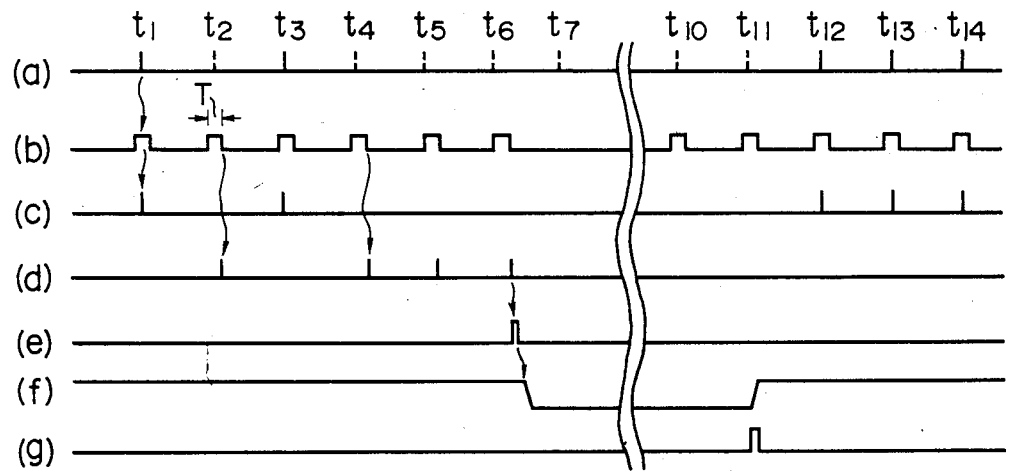
FIG. 3 consisting of (a)-(g) is a diagram showing the relation between signals which are delivered from main parts of the embodiment shown in FIG. 2.

FIG. 2 shows the circuit configuration of an embodiment of a sector mark signal control circuit according to the present invention, and FIG. 3 shows the relation between signals which are delivered from main parts of the embodiment shown in FIG. 2. Referring to FIGS. 2 and 3, an input signal read-out from the optical disc 1 is applied to a sector mark detection circuit 4. Upon detecting an SM signal from the read-out input signal, the sector mark detection circuit 4 delivers a signal a. A repetition period detection circuit 5 is formed of, for example, a ring counter, and counts the repetition period of the sector mark on the basis of the signal a. The repetition period thus obtained is stored in the above circuit 5. A gate signal generation circuit 6 has a built-in timer, which is actuated at a time interval equal to the repetition period stored in the repetition period detection circuit 5, so that the circuit 6 delivers a gate signal b indicating a period T in which the next sector mark should be detected, at the above time interval. The gate signal b from the circuit 6 is applied to the first input terminal of an AND gate 7. The second input terminal of the gate 7 is applied with the output signal a of the sector mark detection circuit 4, and the third input terminal of the gate 7 is applied with the set output f of a flip-flop circuit 12 which will be explained later. When the signals a, b and f are simultaneously applied to the gate 7, the gate 7 delivers a signal c, which is nothing but a normal SM signal and is applied as a first SM signal, to an OR gate 8. While, a pseudo SM signal generation circuit 9 is applied with the output signal a of the sector mark detection circuit 4 (namely, a sector mark detection signal), and with the gate signal b. When the sector mark detection signal a is not detected within the duration period T of the gate signal b, the circuit 9 delivers a pseudo SM signal at the falling edge of the gate signal b. The pseudo SM signal thus obtained is applied to an AND gate 10 together with the set output f of the flip-flop circuit 12. When the pseudo SM signal and the set output f are simultaneously applied to the AND gate 10, the pseudo SM signal passes through the gate 10 and is applied, as a second SM signal, to the OR gate 8. Accordingly, the output of the OR gate 8 is a SM signal which is composed of the normal SM signal (namely, the first SM signal) or the pseudo SM signal (namely, the second SM signal). The SM signal is sent to a control unit (not shown), to detect information in subsequent sectors on the basis of the SM signal.

An output signal d from the AND gate 10, that is, the pseudo SM signal is also applied to the count input terminal C of a counter 11. The output signal c of the AND gate 7, that is, the normal SM signal is applied to the reset terminal R of the counter 11 through an OR gate 15. Further, the set output f of the flip-flop circuit 12 is applied to the reset terminal R of the counter 11 through an inverter 14 and the OR gate 15. Upon counting up to a predetermined number, the counter 11 overflows, that is, delivers an output signal e and goes down to zero. In other words, the generation of the output signal e indicates that the pseudo SM signal has been sent out a predetermined number of times continuously. The output signal e is applied to the repetition period detection circuit 5 and flip-flop circuit 12 to reset these circuits, and is also applied to a repetition period check circuit 13 to actuate this circuit. The repetition period check circuit 13 thus actuated checks the repetition period of the sector maark detection signal a, and delivers a signal g when the above repetition period lies in a predetermined range. The signal g is applied to the flip-flop circuit 12 and repetition period detection circuit 5 to put each of these circuits in a set state.

In a stationary operation, the flip-flop circuit 12 is kept at the set state, and the output signal a of the sector mark detection circuit 4 appears in the duration period of the gate signal b. Thus, the normal SM signal c is sent out to the control unit through the gates 7 and 8 (as shown at a time $t_1$ of FIG. 3). When the sector mark detection signal a is not generated in the duration period of the gate signal b for reasons such as the incomplete recording of sector mark, an erroneous reading operation and an extreme error in synchronization, the pseudo SM signal d is sent to the control unit through the gates 10 and 8 (as shown at a time $t_2$ of FIG. 3). The control unit can continue a predetermined operation on the basis of the pseudo SM signal. When a sector mark on the optical disc 1 is detected in the next period, the normal SM signal c is sent out (as shown at a time $t_3$ of FIG. 3). At this time, the counter 11 is reset, and thus goes down to zero. The above operation is repeated unless the pseudo SM signal is sent out a predetermined number of times or more (for instance, three times or more) continuously.

However, when the pseudo SM signal is sent out a predetermined number of times, for instance, three times continuously (as shown at a time $t_6$ of FIG. 3), the counter 11 delivers the signal e, which resets the flip-flop circuit 12, to prevent the normal SM signal c and pseudo SM signal d from being sent out. Further, the signal e resets the repetition period detection circuit 5 to prepare for the next detection of the repetition period of sector mark, and actuates the repetition period check circuit 13.

The repetition period check circuit 13 thus actuated checks the repetition period of the sector mark extracted from the input signal which is read-out of the optical disc 1. When the above repetition period lies within a predetermined range, the check circuit 13 delivers the output signal g, which puts each of the repetition period detection circuit 5 and flip-flop circuit 12 in a set state. Thus, the set output f of the flip-flop circuit 12 is again delivered (as shown at a time $t_{11}$ of FIG. 3), and is applied to the AND gates 7 and 10. Thus, the normal SM signal c and pseudo SM signal d can be sent out (as shown at a time $t_{12}$ of FIG. 3), and the stationary operation is again performed.

In the foregoing, an embodiment of a sector mark signal control circuit according to the present invention has been explained, by way of example. It is needless to say that various changes in the details of the circuit of FIG. 2 and the combination of circuit elements may be made without departing from the scope and spirit of the invention. For example, the repetition period detection circuit 5, repetition period check circuit 13, gate signal generation circuit 6 and pseudo SM signal generation circuit 9 which are separately provided in the embodiment of FIG. 2, can be included in a single circuit, since the above circuits 5, 13, 6 and 9 have a good many circuit elements in common.

We claim:

1. A sector mark signal control circuit for a disc apparatus using a disc having a plurality of sectors for recording coded data therein and sector marks located at a starting position of each sector, comprising:
   (a) detecting means for detecting a sector mark read-out from the disc;
   (b) first generating means for generating a first sector mark signal at a predetermined time interval at which sector marks should be detected by said detecting means;
   (c) second generating means for generating a second sector mark signal at the predetermined time interval when no sector mark is detected by said detecting means within a predetermined period for the first sector mark signal;
   (d) gate means for delivering either one of the first sector mark signal and the second sector mark signal, to process the coded data read-out from a sector corresponding to said one of the first and second sector mark signal; and
   (e) counter means for detecting how many times the second sector signal has been generated, wherein said gate means inhibits the first and second sector mark signals from being delivered when said counter means counts up continuously to a predetermined number.

2. The sector mark signal control circuit according to claim 1, wherein said counter means is an overflow type counter.

3. The sector mark signal control circuit according to claim 1, further comprising:
   check means operated by said counter means when said counter means counts up continuously to the predetermined number, for checking the repetition period of the sector marks detected by said detecting means, wherein the inhibition by said gate means is released when it is judged by said check means that said repetition period lies in a predetermined range.

4. A sector mark signal control circuit for a disc apparatus using a disc having a plurality of sectors for recording coded data therein and sector marks located at a starting position of each sector, comprising:
   (a) detecting means for detecting a sector mark read-out from the disc;
   (b) first generating means for generating a first sector mark signal at a predetermined time interval at which sector marks should be detected by said detecting means;
   (c) second generating means for generating a second sector mark signal at the predetermined time interval when no sector mark is detected by said detecting means within a predetermined period for the first sector mark signal;
   (d) gate means for delivering either one of the first sector mark signal and the second sector mark signal, to process the coded data read-out from a sector corresponding to said one of the first and second sector mark signals;
   (e) means for counting the repetition period of the sector marks detects by said detecting means, said first generating means producing the first sector mark signal at a time interval equal to the repetition period counter by the counting means; and
   (f) counter means for detecting how many times the second sector mark signal has been generated by said second generating means, wherein said gate means inhibits the first and second sector mark signals from being delivered when said counter means counts up continuously to a predetermined number.

5. A sector mark signal control circuit for a disc apparatus having a plurality of sectors for recording coded data therein and sector marks located at a starting position of each sector, comprising:
   (a) first detecting means for detecting sector marks read-out from a disc;
   (b) second detecting means for counting the repetition period of the sector marks detected by said first detecting means;
   (c) first generating means for generating a first sector mark signal at a time interval equal to the repetition period counted by said second detecting means;
   (d) second generating means for generating a second sector mark signal at a predetermined time interval when no sector mark is detected by said first detecting means within a predetermined period for the first sector mark signal;
   (e) gate means for delivering either one of the first sector signal and the second sector signal, to process the coded data read-out from a sector corresponding to said one of the first and second sector mark signals;
   (f) counter means for detecting how many times the second mark signal has been generated, said gate means inhibiting the first and second sector mark signals from being delivered when said counter means counts up continuously to a predetermined number; and
   (g) check means operated by said counter means for checking the repitition period of the sector marks detected by said first detecting means, the inhibition by said gate means being released when it is judged by said check means that said repetition period lies in a predetermined range.

6. A sector mark signal control method for a disc apparatus having a plurality of sectors for recording coded data therein and sector marks located at a starting position of each sector, said method comprising the steps of:

(a) reading out the sector mark and coded data recorded in the sector corresponding to the sector mark;
(b) detecting the read-out sector mark;
(c) generating a first sector mark signal at a predetermined time interval at which the sector mark should be detected;
(d) generating a second sector mark signal at the predetermined time interval when no sector mark is detected within a predetermined period for the first sector mark signal;
(e) delivering either one of the first sector mark signal and the second sector mark signal; and
(f) processing the coded data read-out from a sector corresponding to said one of the first and second sector mark signals; and
(g) detecting how many times the second sector mark signal has been continuously generated, and inhibiting the first and second sector mark signals from being delivered when the second sector mark signal has been generated a predetermined number of times continuously.

7. The sector mark signal control method according to claim 6, further comprising steps of:
checking the repetition period of the detected sector mark; and
releasing the inhibition when said repetition period lies in a predetermined range.

* * * * *